United States Statutory Invention Registration [19]

[11] Reg. Number: H106

Gilbert [45] Published: Aug. 5, 1986

[54] NOVEL ENERGETIC SULFATE SALTS AND A PROCESS FOR THEIR PREPARATION

[75] Inventor: Everett E. Gilbert, Morristown, N.J.

[73] Assignee: The United States of America as represented by the Secretary of the Army, Washington, D.C.

[21] Appl. No.: 767,994

[22] Filed: Aug. 21, 1985

[51] Int. Cl.[4] ..... C06B 31/42

[52] U.S. Cl. ..... 149/56; 149/92; 149/55; 149/105; 149/109.6; 568/25; 568/932

[58] Field of Search ..... 149/88, 92, 55, 56, 149/105, 109.6; 568/25, 932

*Primary Examiner*—Stephen J. Lechert, Jr.
*Attorney, Agent, or Firm*—Anthony Lane; Robert Gibson; Edward F. Costigan

[57] ABSTRACT

Novel energetic sulfate salts which form a eutectic with ammonium nitrate containing explosive formulations are disclosed. The eutectic quality of such formulations facilitates melt loading thereof. Two typical novel sulfate salts of the invention are 1-(2-ammonium sulfatoethyl)-2,4,6-trinitrobenzene and 1,3-Bis-2(2-ammonium sulfoethyl)-2,4,6-trinitrobenzene. Also disclosed is a method for the synthesis of such sulfate salts together also with a method for the synthesis of the necessary alkanol substituted trinitrobenzene derivative precursor.

32 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NOVEL ENERGETIC SULFATE SALTS AND A PROCESS FOR THEIR PREPARATION

The invention described herein may be manufactured, used and licensed by or for the Government for Governmental purposes without the payment to me of any royalties thereon.

This invention relates to certain eutectic forming novel energetic sulfate salts and to the eutectic explosive mixtures which contain such salts. This invention also relates in another aspect to the methods of synthesizing such salts. The sulfate salts contemplated by this invention are especially useful as a eutectic forming additive in explosive formulations which contain ammonium nitrate.

By way of general background it should be noted that ammonium nitrate, whether by itself or in admixture with, e.g., ethylene diamine dinitrate and potassium nitrate is a well-known explosive. The melt loading of cartridges, shells and other artillery items with ammonium nitrate (m.p. 170 degrees (Celcius)) containing compositions is not only hazardous, but also wasteful of energy and requires especial attention to insulation of the equipment involved.

Thus, there is a need for an additive which will form a eutectic with ammonium nitrate, thereby significantly lowering the melting point of the resulting mixture. However, if the additive itself did not have the same or comparable explosive energy output any advantage obtained from a lowered melting point would be more than offset by a decreased energetic output of the resulting mixture.

The novel energetic sulfate salts of the present invention which themselves have considerable explosive energetic output of their own and which also form eutectics with explosive formulations containing ammonium nitrate are ideally suited to meet this need.

Vender has reported that trinitrotoluene (TNT) will react with formaldehyde to form 1-(2-hydroxyethyl)-2,4,6-trinitrobenzene. See Chem. Abstracts 10, 1513 (1916). In the method suggested by Vender, 1-(2-hydroxyethyl)-2,4,6-trinitrobenzene is obtained by heating TNT with formaldehyde in the presence of a base such as potassium bicarbonate or sodium hydroxide. A report upon subsequent research relating to the Vender synthesis indicates that depending upon the base used or its concentration, there is either no reaction or excessive tar formation or a highly contaminated reaction product. See Journal of Energetic Materials vol. 2, 215–228 (Sept., 1984) published by Dowden, Brodman & Devine, Inc. The disclosure of the aforementioned publication is hereby incorporated in its entirety by this reference thereto.

It has now been surprisingly discovered that the Vender synthesis proceeds with less difficulty and with a higher product purity if the alkaline base (e.g., potassium bicarbonate, sodium hydroxide, sodium carbonate or potassium carbonate) is dissolved in the formaldehyde reactant and the TNT reactant is dissolved in an organic solvent. Such organic solvent is preferably polar and tetrahydrofuran is eminently suitable.

The resulting 1-(2-hydroxyethyl)-2,4,6-trinitrobenzene is a typical alkanol precursor for the synthesis of the sulfate salt compounds contemplated by the present invention. The aforesaid presursor results in the synthesis of 1-(2-ammonium sulfatoethyl)-2,4,6-trinitrobenzene which is typical of one of the novel sulfate salts contemplated by the present invention.

According to the present invention, there is a novel 2,4,6-trinitrobenzene derivative provided which contains $R_1$, $R_2$ and $R_3$ attachments in the 1,3 and 5 positions respectively, wherein (a) $R_1$ is a substituent selected from the group consisting of $—CH_2CH_2OSO_3NH_4$ and $—CH_2CH_2CH_2OSO_3NH_4$;

(b) $R_2$ is a substituent selected from the group consisting of —H, $—CH_3$, $—CH_2CH_3$, $—C(CH_3)_3$, $—CH(CH_3)_2$, $—CH_2Pi$, $—CH_2CH_2Pi$, $—CH_2CH_2OSO_3NH_4$ and $—CH_2CH_2CH_2OSO_3NH_4$ wherein Pi is an aryl, alkyl or alkylaryl group of up to about 12 carbon atoms and (c) $R_3$ is a substituent selected from the group consisting of —H, $—CH_3$, $—CH_2CH_3$, $—C(CH_3)_3$, $—CH(CH_3)_2$, $—CH_2Pi$, $—CH_2CH_2Pi$, $—CH_2CH_2OSO_3NH_4$ and $—CH_2CH_2CH_2OSO_3NH_4$ wherein Pi is an aryl, alkyl or alkylaryl group of up to about 12 carbon atoms.

In another aspect of the present invention, a method is provided for the synthesis of the novel $R_1$ and $R_2$ disubstituted trinitrobenzene derivatives also included in the present invention ($R_3$ being —H in that case) from an alkanol precursor 2,4,6-trinitrobenzene compound containing 1,3-substituents $R_4$ and $R_5$ wherein (a) $R_4$ is selected from the group consisting of $—CH_2CH_2OH$ and an alkanol radical containing up to about 12 carbon atoms; and (b) $R_5$ is selected from the group consisting of —H, an alkane radical containing up to about 12 carbon atoms, $—CH_2CH_2OH$ and an alkanol radical containing up to about 12 carbon atoms which comprises the steps of (1) reacting said alkanol precursor compound with a stoichiometric quantity of chlorosulfuric acid to form a supernatant liquid and a solid intermediate complex and (2) reacting the solid intermediate complex with a stoichiometric quantity of ammonium hydroxide to yield a final compound according to claim 3.

In yet another aspect of the present invention, a method is provided for the synthesis of the alkanol presursor referred to immediately above from TNT which comprises reacting a 2,4,6-trinitrobenzene derivative compound containing 1,3-substituents $R_6$ and $R_7$ wherein (i) $R_6$ is selected from the group consisting of $—CH_3$ and an alkane radical containing up to about 12 carbon atoms; and (ii) $R_7$ is selected from the group consisting of —H-,$—CH_3$ and an alkane radical containing up to about 12 carbon atoms in an organic solvent solution with formaldehyde containing a base dissolved therein.

The following illustrative but non-limiting examples will aid in a further understanding of the present invention. It will also be readily apparent that in the succeeding examples no alkyl or alkylaryl substituents are included in the available locations of the benzene ring of the resulting novel sulfate salt compound. However, in practice, there is no reason why an alkyl or alkylaryl substituent may not be present in any such available location or locations (with a suitable choice of starting materials) so long as there is no undue interference with the energetic output of the resulting novel sulfate salt. A total of up to 12 atoms, in addition to those already present on the benzene ring and in the ammonium sulfatoethyl ligand or ligands represents the allowable limit of the size of such alkyl or alkylaryl substituents beyond which the energetic output of the resulting novel sulfate salt may be adversely affected. In any specific case, the allowable limit of the size of any such alkyl or alkylaryl substituent can be determined by a person of ordinary skill in the art to which the present invention pertains without undue experimentation.

EXAMPLE 1

To 13.0 g of 1-(2-hydroxyethyl)-2,4,6-trinitrobenzene slurried in 100 ml of methylene chloride, 7.0 g of chlorosulfuric acid dissolved in 50 ml of the same solvent is added with stirring and cooling. An oil separates, which is stirred at room temperature for 15 minutes, during which time it solidifies. The methylene chloride layer is decanted, fresh solvent is added to the solid residue and the solvent is again decanted. The solid residue is dissolved in 250 ml of isopropanol. Aqueous ammonium hydroxide of 15% w/w strength is added to the isopropanol solution to slight excess. A heavy slurry is formed. The slurry is filtered, the solid product washed with isopropanol and dried. 16.8 g of the 1-(2-ammonium sulfatoethyl)-2,4,6-trinitrobenzene product representing a 95% of theoretical maximum yield is obtained.

The product is a light tan solid. After recrystallization from an isopropanol-water mixture, it melts at 235 degrees Celcius with decomposition. Elemental analysis of the product for C,H and S agrees with the predicted theoretical proportions.

The infrared spectrum of the product shows absorption bands chracteristic of the presence of ammonium, sulfate and nitro groups.

The product was further tested upon a Mettler TA-2 Thermoanalyzer. The product decomposes energetically, possibly even with ignition at 232 degrees celcius, with a 60% loss of weight.

EXAMPLE 2

The product of Example 1 is mixed with an equal weight of an explosive formulation comprising 46% w/w ammonium nitrate, 46% w/w ethylenediamine dinitrate and 8% w/w potassium nitrate. The resulting mixture melts at 97 degrees Celcius. It is cooled to room temperature and reheated. The melting point of the mixture now is 93 degrees Celcius indicating the formation of a eutectic.

EXAMPLE 3

To 6.0 g of the diol precursor mentioned in Example 1 slurried in 50 ml methylene chloride, 6.0 g of chlorosulfuric acid dissolved in 50 ml of methylene chloride is added with stirring and cooling. The mixture is stirred for 30 minutes at room temperature and the supernatant liquid is decanted. The insoluble material is then washed with a fresh portion of methylene chloride after which it is dissolved in 150 ml of isopropanol. Aqueous ammonium hydroxide of 15% w/w strength is added to the isopropanol solution to slight excess to yield a heavy precipitate, which is filtered and dried. The resulting solid product which is 1,3-Bis-(2-ammmonium sulfatoethyl)-2,4,6-trinitrobenzene weighs 9.1 g presenting 91% of theoretical maximum yield.

The product is recrystallized from an isopropanol-water mixture to yield an off-white solid which melts at 287 degrees Celcius with decomposition. Elemental analysis of the product for C and H agrees with the predicted theoretical proportions.

The infrared spectrum of the product shows absorption bands characteristic of the presence of ammonium, sulfate and nitro groups being similar as a whole to the infrared spectrum for the product of Example 1.

EXAMPLE 4

The product of Example 3 is mixed with an equal weight of the explosive formulation of Example 2. The resulting mixture melts at 102.6 degrees Celcius. It is cooled to room temperature and reheated. The melting point of the mixture now is 95.8 degrees Celcius, indicating the formulation of a eutectic.

EXAMPLE 5

A solution of 0.6 g anhydrous potassium carbonate in 12.0 ml formaldehyde is added all at once with stirring to a hot solution of 13.5 g of TNT in 75 ml of tetrahydrofuran. The mixture is refluxed with stirring for one hour, poured into 400 ml of water and acidified with a small amount of hydrochloric acid. Upon standing overnight, crystals form which are filtered and dried.

The yield of the resulting 1-(2-hydroxyethyl)-2,4,6-trinitrobenzene is 14.0 g which represents 92% of the theoretical maximum yield. Chromatographic analysis shows a product purity of 99.6% with 0.3% TNT present as an unreacted impurity.

The product has a melting point of 110 to 112 degrees Celcius following recrystallization from isopropanol.

The infrared absorption spectrum of the product shows absorption bands at the following frequencies (in reciprocal centimeters) which are diagnostic of the groups indicated in parentheses:

3560 (—OH), 3090, 1600, 1530 ($—NO_2$), 1350 ($—NO_2$), 1040 ($—CH_2OH$), 910, 740 and 720.

The scope of the present invention is further defined by and should be read in conjunction with the appended claims.

What is claimed is:

1. A novel 2,4,6-trinitrobenzene derivative containing $R_1$, $R_2$ and $R_3$ attachments in the 1,3 and 5-positions respectively wherein (a) $R_1$ is a substituent selected from the group consisting of $—CH_2CH_2OSO_3NH_4$ and $—CH_2CH_2CH_2OSO_3NH_4$;

(b) $R_2$ is a substituent selected from the group consisting of —H, $—CH_3$, $—CH_2CH_3$, $—C(CH_3)_3$, $—CH(CH_3)_2$, $—CH_2Pi$, $—CH_2CH_2Pi$, $—CH_2CH_2OSO_3NH_4$ and $—CH_2CH_2CH_2OSO_3NH_4$ wherein Pi is an aryl, alkyl or alkylaryl group of up to about 12 carbon atoms and (c) $R_3$ is a substituent selected from the group consisting of —H, $—CH_3$, $—CH_2CH_3$, $—C(CH_3)_3$, $—CH(CH_3)_2$, $—CH_2Pi$, $—CH_2CH_2Pi$, $—CH_2CH_2OSO_3NH_4$ and $—CH_2CH_2CH_2OSO_3NH_4$ wherein Pi is an aryl, alkyl or alkylaryl group of up to about 12 carbon atoms.

2. A compound according to claim 1 wherein $R_1$ is a substituent selected from the group consisting of $—CH_2CH_2OSO_3NH_4$ and $—CH_2CH_2CH_2OSO_3NH_4$; $R_2$ is a substituent selected from the group consisting of —H, $—CH_3$, $—CH_2CH_3$, $—CH_2CH_2OSO_3NH_4$ and $—CH_2CH_2CH_2OSO_3NH_4$; and $R_3$ is a substituent selected from the group consisting of —H, $—CH_3$, $—CH_2CH_3$, $—CH_2CH_2OSO_3NH_4$ and $—CH_2CH_2CH_2OSO_3NH_4$.

3. A compound according to claim 2 wherein $R_1$ is a substituent selected from the group consisting of $—CH_2CH_2OSO_3NH_4$ and $—CH_2CH_2CH_2OSO_3NH_4$; $R_2$ is a substituent selected from the group consisting of —H, $—CH_3$, $—CH_2CH_3$, $—CH_2CH_2OSO_3NH_4$ and $—CH_2CH_2CH_2OSO_3NH_4$ and $R_3$ is —H.

4. A compound according to claim 3 wherein $R_1$ is a substituent selected from the group consisting of $—CH_2CH_2OSO_3NH_4$ and $—CH_2CH_2CH_2OSO_3NH_4$; and $R_2$ is —H.

5. A compound according to claim 4 wherein $R_1$ $—CH_2CH_2OSO_3NH_4$.

6. A compound according to claim 3 wherein $R_1$ and $R_2$ are nonidentical substituents selected from the group consisting of $—CH_2CH_2OSO_3NH_4$ and $—CH_2CH_2CH_2OSO_3NH_4$.

7. A compound according to claim 3 wherein $R_1$ and $R_2$ are identical substituents selected from the group consisting of $—CH_2CH_2OSO_3NH_4$ and $—CH_2CH_2CH_2OSO_3NH_4$.

8. A compound according to claim 3 wherein $R_1$ and $R_2$ are both $—CH_2CH_2CH_2OSO_3NH_4$.

9. An improved explosive formulation which comprises ammonium nitrate in admixture with an effective amount of the sulfate salt compound of claim 1 to result in the formation of a eutectic mixture.

10. The explosive formulation of claim 9 which comprises 23% w/w ammonium nitrate and 50% w/w of said sulfate salt compound.

11. The explosive formulation of claim 10 which comprises 23% w/w ammonium nitrate, 23% w/w ethylenediamine dinitrate, 4% w/w potassium nitrate and 50% w/w of said sulfate salt compound.

12. The explosive formulation of claim 11 wherein said sulfate compound is 1-(2-ammonium sulfatoethyl)-2,4,6-trinitrobenzene.

13. The explosive formulation of claim 11 wherein said sulfate compound is 1,3-Bis-2(2-ammonium sulfatoethyl)-2,4,6-trinitrobenzene.

14. A process for making the eutectic mixture of claim 9 which comprises the steps of (a) mixing together the ammonium nitrate with said sulfate salt compound to form an intermediate mixture; and (b) heating the intermediate mixture to a temperature sufficient to cause liquefaction.

15. A process for synthesizing the compound of claim 3 from an alkanol precursor 2,4,6-trinitrobenzene compound containing 1,3-substituents $R_4$ and $R_5$ wherein (a) $R_4$ is selected from the group consisting of $—CH_2CH_2OH$ and an alkanol radical containing up to about 12 carbon atoms; and (b) $R_5$ is selected from the group consisting of —H, an alkane radical containing up to about 12 carbon atoms, $—CH_2CH_2OH$ and an alkanol radical containing up to about 12 carbon atoms which comprises the steps of (1) reacting said alkanol precursor compound with a stoichiometric quantity of chlorosulfuric acid to form a supernatant liquid and a solid intermediate complex and (2) reacting the solid intermediate complex with a stoichiometric quantity of ammonium hydroxide to yield a final compound according to claim 3.

16. The process of claim 14 wherein the alkanol precursor is slurried in methylene chloride prior to reaction with said chlorosulfuric acid.

17. The process of claim 14 wherein the chlorosulfuric acid is dissolved in methylene chloride prior to reaction with said alkanol precursor.

18. The process of claim 14 wherein the reaction of the alkanol precursor with the chlorosulfuric acid is conducted at room temperature.

19. The process of claim 14 wherein the alkanol precursor is reacted with the chlorosulfuric acid over a time period of about 15 minutes to about 30 minutes.

20. The process of claim 14 wherein the solid intermediate complex is separated from the supernatant liquid before it is reacted with ammonium hydroxide.

21. The process of claim 19 wherein the solid intermediate complex is washed with a fresh portion of methylene chloride before it is reacted with ammonium hydroxide.

22. The process of claim 19 wherein the solid intermediate complex is dissolved in isopropanol before it is reacted with ammonium hydroxide.

23. The process of claim 14 wherein the solid intermediate complex is reacted with an excess quantity of ammonium hydroxide.

24. The process of claim 14 wherein the ammonium hydroxide is in aqueous solution of about 15% w/w strength.

25. The process of claim 14 wherein the final product compound is purified by filtration.

26. The process of claim 24 wherein the filtered final product compound is further purified by recrystallization from a liquid medium.

27. The process of claim 25 wherein the liquid medium is isopropanol.

28. The process of claim 24 wherein the liquid medium is a mixture of isopropanol and water.

29. A method for synthesizing the alkanol precursor of claim 14 which comprises reacting a 2,4,6-trinitrobenzene derivative compound containing 1,3-substituents $R_6$ and $R_7$ wherein (i) $R_6$ is selected from the group consisting of $—CH_3$ and an alkane radical containing up to about 12 carbon atoms; and (ii) $R_7$ is selected from the group consisting of —H, $—CH_3$ and an alkane radical containing up to about 12 carbon atoms in an organic solvent solution with formaldehyde containing a base dissolved therein.

30. The method of claim 29 wherein the organic solvent is polar.

31. The method of claim 29 wherein the organic solvent is tetrahydrofuran.

32. The method of claim 28 wherein the dissolved base is selected from the group consisting of potassium bicarbonate, sodium hydroxide, sodium carbonate, potassium carbonate and mixtures thereof.

* * * * *